United States Patent [19]

Coates-Smith

[11] Patent Number: 4,773,439

[45] Date of Patent: Sep. 27, 1988

[54] CHANGEOVER VALVE

[76] Inventor: Ronald R. Coates-Smith, 74 Hurst Rd., Horsham, West Sussex, England

[21] Appl. No.: 137,739

[22] Filed: Dec. 24, 1987

[51] Int. Cl.[4] .......................................... F16K 11/02
[52] U.S. Cl. .............................. 137/102; 137/625.2; 137/625.66; 251/75
[58] Field of Search .................... 137/102, 104, 625.2, 137/625.66; 251/75; 91/318, 345

[56] References Cited

U.S. PATENT DOCUMENTS 3,353,559  11/1967  Phillips .............................. 251/75 X
3,448,756   6/1969  Nordegren .......................... 137/104

FOREIGN PATENT DOCUMENTS 925809  7/1949  Fed. Rep. of Germany ........ 91/345

Primary Examiner—Robert G. Nilson
Attorney, Agent, or Firm—Lon H. Romanski

[57] ABSTRACT

There is described a valve having three ports (3,4,5) one of which (3 or 4) is selectively closed by a bistable toggle-action valve member (6). An actuating member (17) driven by a pressure sensor (23) operates the valve member via cooperating abutments (18,19,20), the actuating member also having a bistable toggle-action and engaging the valve member as it approaches the end of its travel in either direction, to carry the valve member (6) over its balance point and thus effect the changeover of the valve.

6 Claims, 1 Drawing Sheet

CHANGEOVER VALVE

The present invention relates to valves, and is particularly concerned with a bistable valve having three ports, a first of which is connected to a pressure sensor and the second and third ports are respectively opened and closed in response to changes in the sensed pressure. A particular application of the present valve is to vary the pressure within an enclosure in a cyclic fashion by alternatively providing fluid connection either between the enclosure and a pressure source or between the enclosure and an exhaust port.

According to the present invention, a changeover valve has first to third ports and provides fluid communication between either the first and second ports, or the first and third ports, and comprises a housing into which the three ports open, a valve member movable between a first position in which the second port is closed and the third open and a second position in which the third port is closed and the second open, first resilient means acting continuously on the valve member to urge the valve member away from a balance point it its travel intermediate its first and second positions, and an actuating member movable between first and second positions and having associated therewith second resilient means to urge the actuating member away from a balance point in its travel intermediate its first and second positions, the actuating member and valve member including cooperating abutments engageable to transmit motion of the actuating member to the valve member, and the valve further including pressure responsive means to urge the actuating member from its first position to its second position and from its second position to its first position, the arrangement being such that when the pressure responsive means urges the actuating member out of its first position and past its balance point, the second resilient means propels the actuating member toward its second position and during this motion the abutments engage and the valve member is carried out of its first position and past its balance point by the actuating member, whereupon the first resilient means propels the valve member to its second position, and when the pressure responsive means urges the actuating member out of its second position and past its balance point, the second resilient means propels the actuating member towards its first position and during this part of the motion the abutments engage and the valve member is carried out of its second position and past its balance point by the actuating member, whereupon first resilient means propels the valve member to its first position.

The valve member and the actuating member thus both exhibit a "toggle" action: as the actuating member is moved past its balance point and "flies" to the end of its travel, so it engages the valve member to carry it past its balance point and effect the changeover of the valve.

An embodiment of the present invention will now be described in detail with reference to the accompanying drawings in which.

Figure 1:
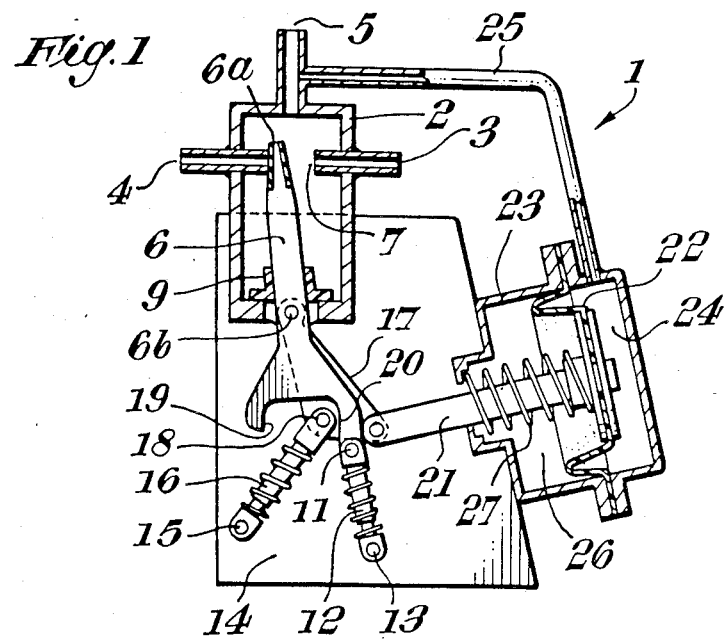
FIG. 1 is a sectional view of the valve in a first stable position.

Referring now to the figures, the valve 1 comprises a sealed housing 2 having three ports in fluid connection with the interior of the housing. An inlet port 3 is connected to a source of pressurized fluid, an exhaust port 4 is connected to atmosphere, and an outlet port 5 leads to an enclosed volume wherein fluid pressure is to be maintained within preset limits. The fluid may be a gas or a liquid.

An elongate valve member 6 is pivotally mounted at a point 6b adjacent its centre, with one end 6a extending into the housing 2. The upper end 6a of the valve member carries a sealing portion which may cooperate with seat surfaces 7 and 8 associated with the inlet and exhaust ports 3 and 4 respectively. A sealing skirt 9 surrounds the valve member 6 to provide a seal where it enters the housing 2, the sealing skirt being flexible to allow pivoting of the valve member 6 to bring its sealing portion into contact with one or other of the seat surfaces 7 and 8.

At its end remote from the sealing portion, the valve member 6 is pivotally connected at 11 to a resilient strut 12 which is pivotally mounted at 13 on a support 14 fixed in relation to the housing 2.

The resilient strut 12 comprises two telescopic guide elements surrounded by a compression spring, the spring being under a pretension to exert an outward force on the ends of the strut 12.

Figure 2:
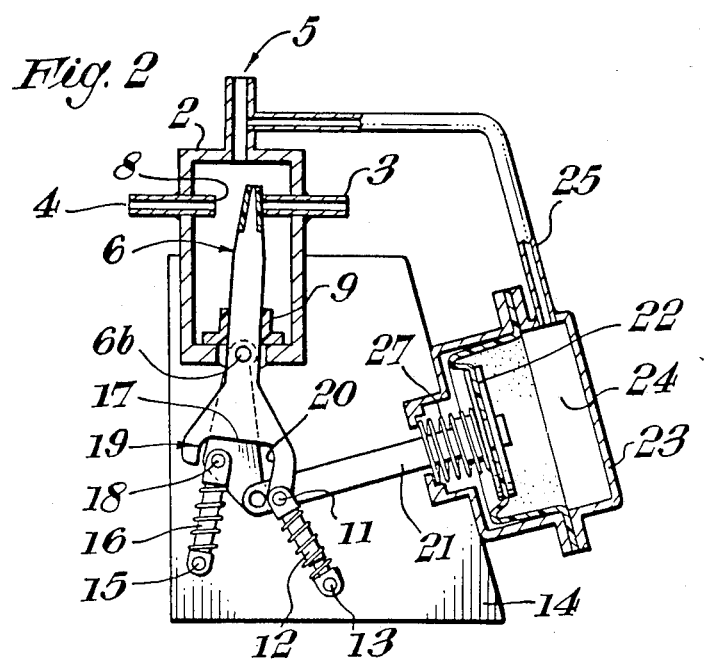
FIG. 2 is a sectional view similar to FIG. 1 showing the valve in a second stable position.

The resilient strut 12 and its fixed pivot 13 are so arranged as to exert a "toggle" action on the valve member 6, in that as the valve member 6 pivots about its central pivot from its first position, shown in FIG. 1, to its second position, shown in FIG. 2, the strut 12 is first compressed until the pivots 13,11, and 6b are aligned. This alignment is arranged to occur when the sealing portion held at the end 6a of the valve member 6 is between the two seat surfaces 7 and 8. Clearly, once moved past this aligned position, the resilient strut 12 acts to propel the valve member to complete its travel and assume the second position. Similarly, in the return direction the resilient strut 12 first resists the motion and then, when the alignment point is passed, propels the valve member to its first position. Also mounted to pivot about a fixed axis 15 relative to the support 14 are a further pair of resilient struts 16, of which one only is shown. A yoke 17, itself pivoting about the pivot axis 6b of the valve member 6, is attached to the free ends of the resilient struts 16, and a pin 18 extending between the free ends of struts 16 is positioned between, and may engage with one or other of a pair of abutment surfaces 19 and 20 formed on the valve member 6.

The yoke 17 is connected via a pushrod 21 to a diaphragm 22 of a pressure sensing unit 23. The pressure sensing unit comprises a hollow casing divided into two chambers by the diaphragm 22. One chamber 24 is in fluid connection via a line 25 with the port 5, and thus with the volume whose pressure is to be controlled. The other chamber 26 is vented to atmosphere. A spring 27 surrounds the pushrod, bearing at its ends on the diaphragm 22 and on the support 14 respectively.

The operation of the valve to cause a cyclic pressure variation in an enclosed volume will now be described.

The valve is first connected to the volume at port 5, and ports 3 and 4 are connected respectively to a source of fluid at a pressure higher than the maximum cycle pressure in the volme, and to atmosphere.

When unpressurised the spring 27 urges the diaphragm to the right as seen in the figures, thus drawing the yoke 17, via the pushrod 21, until the pin 18 contacts the abutment surface 20 and urges the valve member to rotate anti-clockwise to the position shown in FIG. 1. The "toggle" action of the resilient strut 12 maintains the valve member 6 in position closing off the exhaust port 4.

Pressurised fluid is thus admitted by the open port 3, and pressure builds up in the volume and is transmitted via line 25 to the chamber 24 where it acts on the diaphragm 22, urging it to the left. Leftward movement of the diaphragm is resisted by the spring 27 and the resilient struts 16 acting on the yoke 17.

As the pressure in chamber 24 rises, the force in the pushrod 21 increases until the combined forces of the spring 27 and resilient struts 16 are overcome, and the pushrod is moved to the left. This causes an increase of resistance due to the spring 27 being in greater compression, but the resistance due to the resilient struts decreases until a position is reached where the pin 20 lies directly between pivots 15 and 6b. Pressure in the chamber 24 is balanced only by the spring 27 at this point.

Should the pressure in chamber 24 then slightly increase, the struts 16 are moved away from their equilibrium position, and act with the pressure in chamber 24 to urge the pushrod 21 to the left. The yoke 17 is thus propelled leftwards and the pin 18 strikes the abutment 19. This causes the valve member to be displaced abruptly to its second position, since in its first position the points 6b, 11 and 13 are arranged to be almost in alignment.

The yoke 17 and resilient struts 16 may accompany the valve member 6 to its second position, or may strike a stop before this position is reached.

In the second position, shown in FIG. 2, the supply of pressurized fluid through port 3 is cut off, and the volume is vented to atmosphere through port 4. The pressure in the volume therefore falls, as does the pressure in chamber 24.

Spring 27 then urges the pushrod 21 to the right, against the resistance of the resilient struts 16, until the equilibrium position of the yoke is reached. Thereafter the yoke "flies" to the right, and the pin 18 contacts the abutment surface 20 of the valve member, causing the valve member 6 to move back to its first position.

The pressures at which the valve will change over may be controlled by altering the spring rates and precompression in the spring 27 and the resilient struts 12 and 16, so that the supply of pressurized fluid is cut off when the pressure sensed in chamber 24 reaches an upper value, and the exhaust valve is opened, and when the pressure sensed reaches a lower value the exhaust valve is closed and the supply reinstated. Clearly, by ensuring a pressurized supply at a pressure greater than the upper value and an exhaust to a pressure less than the lower value, the valve will perform a continuous cyclic operation repeatedly raising the pressure in the volume connected to port 5 to the upper value and then lowering the pressure to the lower value.

Such a cyclic variation could for example be used directly in an artificial respirator ("iron lung"), or may be used by connecting port 5 to a closed volume to provide an intermittent supply of a pressurized gas from port 4, for example intermittently to fuel a lamp or other burner directly or via a pressure regulator.

The valve may also be used to maintain a pressure within an enclosure by connecting the enclosure to port 5 and blanking off the exhaust port 4. In this arrangement, when the pressure reaches an upper value the inlet port 3 will be closed, whereupon leakage or a temperature change may cause the pressure to drop. On reaching the lower preset value, the inlet is reopened to raise the pressure again by admitting more pressurised fluid.

In yet another useful application of the device, a container connected to port 5 is purged of unwanted gases or vapours by repeatedly pressurising and exhausting the container, using a purging gas. For example, an inert atmosphere may be achieved by repeated pressurisation with nitrogen and exhausting, or a dry atmosphere may be achieved by repeatedly supplying dry air under pressure and then exhausting to atmosphere or to a dryer connected in a closed circuit to the supply port.

While the invention has been described in relation to a single embodiment, it is to be understood that changes in the configuration of the device may be made without departing form the principles of the invention. For example, the diaphragm 22 may be replaced by a piston and cylinder arrangement, or by a bellows. Further, the seal 9 may be eliminated by placing the entire mechanism of the valve within the housing 2, and utilising a part of the wall of housing 2 as the pressure sensing means, for example by forming part of the wall as a movable diaphragm.

The "toggle" actions associated with the valve member 6 and yoke 17 may be provided by devices other than resilient struts; for example tension springs may be used, provided the "over-centre" toggle action is maintained.

I claim:

1. A changeover valve having first to third ports and providing fluid communication between either the first and second ports, or the first and third ports, comprises a housing into which the three ports open, a valve member movable between a first position in which the second port is closed and the third port is open and a second position in which the third port is closed and the second port is open, first resilient means acting continuously on the valve member to urge the valve member away from a balance point in its travel intermediate its first and second positions, and an actuating member movable between first and second positions and having associated therewith second resilient means to urge the actuating member away from balance point in its travel intermediate its first and second positions, the actuating member and valve member including cooperating abutments engageable to transmit motion of the actuating member to the valve member, and the valve further including pressure responsive means to urge the actuating member from is first position to its second position and from its second position to its first position, the arrangement being such that when the pressure responsive means urges the actuating member out of its first position and past its balance point, the second resilient means propels the actuating member toward its second position and during this motion the abutments engage and the valve member is carried out of its first position and past its balance point by the actuating member, whereupon the first resilient means propels the valve member to its second position, and when the pressure responsive means urges the actuating member out of its second position and past its balance point, the second resilient means propels the actuating member towards its first position and during this part of the motion the abutments engage and the valve member is carried out of its second position and past its balance point by the actuating member, whereupon first resilient means propels the valve member to its first position.

2. A valve according to claim 1, wherein the valve member and actuating member are pivotally mounted, and the first and second resilient means comprise resilient struts pivotally mounted at one of their ends to the valve member and actuating member respectively, and mounted at their respective other ends to the housing, the pivot axes of the valve and actuating members being aligned with their respective struts when in their respective balance point positions.

3. A valve according to claim 1, wherein the abutments of the valve member and actuating member comprise two oppositely facing abutment surfaces on the valve member which are engaged by a portion of the actuating member extending therebetween.

4. A valve according to claim 3, wherein the said portion of the actuating member engages one and then the other of abutment surfaces during successive movements of the actuating member.

5. A valve according to claim 1, wherein the pressure responsive means includes a flexible diaphragm linked to the actuating member via a pushrod, and subjected to fluid pressure from the first port on one of its faces and to a reference pressure on its other face.

6. A valve according to claim 5, wherein a third resilient means acts on the diaphragm to assist the force exerted by the reference pressure thereon.

* * * * *